(12) United States Patent
Hou et al.

(10) Patent No.: US 11,716,718 B2
(45) Date of Patent: Aug. 1, 2023

(54) WIRELESS COMMUNICATION DEVICE AND WIRELESS COMMUNICATION METHOD

(71) Applicant: Sony Group Corporation, Tokyo (JP)

(72) Inventors: Yanzhao Hou, Beijing (CN); Qimei Cui, Beijing (CN); Shiwei Cao, Beijing (CN); Hui Liang, Beijing (CN); Qinyan Jiang, Beijing (CN); Shiyu Zhang, Beijing (CN); Xin Guo, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/686,434

(22) Filed: Mar. 4, 2022

(65) Prior Publication Data

US 2022/0322354 A1    Oct. 6, 2022

Related U.S. Application Data

(63) Continuation of application No. 16/525,610, filed on Jul. 30, 2019, now abandoned, which is a (Continued)

(30) Foreign Application Priority Data

Jul. 7, 2015   (CN) .......................... 201510395183.6

(51) Int. Cl.
   *H04W 4/40*   (2018.01)
   *H04W 72/044*   (2023.01)
   *H04W 4/90*   (2018.01)
   *H04W 52/28*   (2009.01)
   (Continued)

(52) U.S. Cl.
   CPC ......... *H04W 72/0473* (2013.01); *H04W 4/40* (2018.02); *H04W 4/70* (2018.02);
   (Continued)

(58) Field of Classification Search
   CPC ..... H04W 72/0473; H04W 4/40; H04W 4/70; H04W 4/90; H04W 52/281; H04W 72/10;
   (Continued)

(56) References Cited

U.S. PATENT DOCUMENTS

2013/0178221 A1*  7/2013  Jung ................... H04W 52/146
                                                          455/450
2014/0160946 A1   6/2014  Bodas et al.
(Continued)

FOREIGN PATENT DOCUMENTS

CN   104540236 A   4/2015
CN   104754748 A   7/2015
(Continued)

OTHER PUBLICATIONS

3GPP TSG RAN WG1 Meeting #75 Nov. 11-15, 2013 (Year: 2013).
International Search Report dated Sep. 30, 2016 in PCT/CN2016/088562, 2 pages.

*Primary Examiner* — Thai Nguyen
(74) *Attorney, Agent, or Firm* — Xsensus LLP

(57) ABSTRACT

The present disclosure relates to a wireless communication device and a wireless communication method. The wireless communication device according to one embodiment comprises one or more processors, wherein the processor(s) is/are configured to acquire the type of information to be transmitted via device-to-device communication, wherein the type is one of a plurality of types at least including a first type and a second type; and the processor(s) is/are also configured to determine a resource use manner and a power control manner which are used for transmitting information at least according to the type of the information.

20 Claims, 11 Drawing Sheets

Related U.S. Application Data continuation of application No. 15/742,212, filed as application No. PCT/CN2016/088562 on Jul. 5, 2016, now Pat. No. 10,420,111.

(51) Int. Cl.
*H04W 72/56* (2023.01)
*H04W 4/70* (2018.01)
*H04W 4/46* (2018.01)

(52) U.S. Cl.
CPC ........... *H04W 4/90* (2018.02); *H04W 52/281* (2013.01); *H04W 72/56* (2023.01); *H04W 4/46* (2018.02)

(58) Field of Classification Search
CPC ..... H04W 4/46; H04W 92/18; H04W 52/242; H04W 72/1242; H04W 4/30; H04W 72/12; H04W 52/247
See application file for complete search history.

(56) References Cited

U.S. PATENT DOCUMENTS

| | | |
|---|---|---|
| 2014/0274196 A1 | 9/2014 | Dai et al. |
| 2015/0173048 A1 | 6/2015 | Seo |
| 2016/0157185 A1* | 6/2016 | Chae ................... H04W 52/383 370/311 |
| 2016/0174122 A1* | 6/2016 | Sorrentino ............ H04W 36/22 370/331 |
| 2016/0295624 A1 | 10/2016 | Novlan et al. |
| 2017/0086150 A1* | 3/2017 | Wang ................ H04W 72/0473 |
| 2018/0176871 A1* | 6/2018 | Li ....................... H04W 52/383 |

FOREIGN PATENT DOCUMENTS

| | | |
|---|---|---|
| WO | WO-2014012244 A1 | 1/2014 |
| WO | 2014/086204 A1 | 6/2014 |
| WO | 2016/078684 A1 | 5/2016 |

* cited by examiner

WIRELESS COMMUNICATION DEVICE AND WIRELESS COMMUNICATION METHOD

CROSS-REFERENCE TO RELATED APPLICATIONS

This application is a continuation of U.S. application Ser. No. 16/525,610, filed Jul. 30, 2019, which is a continuation of U.S. application Ser. No. 15/742,212, filed Jan. 5, 2018 (now U.S. Pat. No. 10,420,111), which is based on PCT filing PCT/CN2016/088562, filed Jul. 5, 2016, and claims priority to CN 201510395183.6, filed Jul. 7, 2015, the entire contents of each are incorporated herein by reference.

FIELD

The present disclosure generally relates to the field of wireless communications, and in particular to a wireless communication device and a wireless communication method.

BACKGROUND

Device-to-device (D2D) communication generally refers to a communication in which user data can be transmitted directly between terminals without being relayed via a network. D2D communication can reduce a load of a base station and can remedy the defect that cellular devices outside of the coverage of the base station cannot communicate effectively.

D2D communication can be applied to various scenarios. For example, traffic data of user plane may be directly transmitted locally without transmitting via network side, to offload a cellular network traffic, for example; wireless communication between terminals are ensured with the D2D communication in a case where a natural catastrophe occurs and traditional communication network infrastructures are damaged; and D2D communication enhanced for the Internet of Things, etc.

SUMMARY

In the following, a brief overview of embodiments of the present disclosure is given below to provide basic understanding to some aspects of the present disclosure. It should be understood that this overview is not an exhaustive overview of the present disclosure. It is neither intended to determine a critical part or an important part of the present disclosure, nor to limit the scope of the present disclosure. The object of the overview is only to give some concepts in a simplified manner, which serves as a preface of a more detailed description later.

A wireless communication device is provided according to an embodiment. The device includes at least one professor. The professor is configured to acquire the type of information to be transmitted via a device-to-device communication, wherein the type is one of multiple types which include at least a first type and a second type. The processor is further configured to determine a resource utilization manner and a power control manner for transmitting the information at least based on the type of the information.

A wireless communication method is provided according to another embodiment. The method includes a step of acquiring the type of information to be transmitted via a device-to-device communication, wherein the type is one of multiple types which include at least a first type and a second type. The method further includes a step of determining a resource utilization manner and a power control manner for transmitting the information at least based on the type of the information.

A wireless communication device for base station side is provided according to yet another embodiment. The device includes at least one processor. The professor is configured to determine the type of information to be transmitted by a user equipment via a device-to-device communication based on indication information from the user equipment, wherein the type is one of multiple types which include at least a first type and a second type. The processor is further configured to determine, based on the type, a resource scheduling manner and a power control manner for the user equipment to transmit the information.

A wireless communication method for base station side is provided according to still another embodiment. The method includes a step of determining the type of information to be transmitted by a user equipment via a device-to-device communication based on indication information from the user equipment, wherein the type is one of multiple types which include at least a first type and a second type. The method further includes a step of determining, based on the type, a resource scheduling manner and a power control manner for the user equipment to transmit the information.

BRIEF DESCRIPTION OF THE DRAWINGS

The present disclosure may be better understood with reference to the description hereinafter in conjunction with the drawings. Same or similar components are indicated by same or similar reference numbers throughout the drawings. The drawings, together with the detailed description below, are incorporated in and form a part of the specification, for further illustrating preferred embodiments of the present disclosure with examples and explaining the principle and advantages of the present disclosure. In the drawings.

DETAILED DESCRIPTION OF EMBODIMENTS

Figure 1:
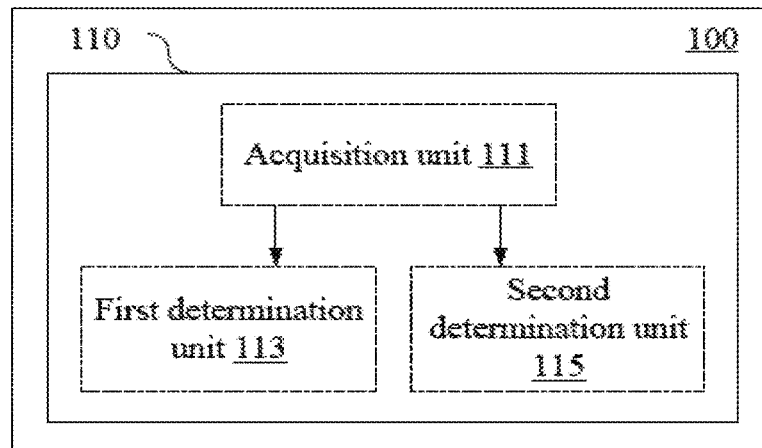
FIG. 1 is a block diagram showing a configuration example of a wireless communication device according to an embodiment of the present disclosure.

Hereinafter, embodiments of the present disclosure will be described in conjunction with the drawings. Elements and features described in one drawing or one embodiment of the present disclosure can be combined with elements and features shown in one or more of other drawings or embodiments. It should be noted that representations and descriptions of components and processing which are irrelevant to the present disclosure and known by those skilled in the art are omitted in the drawings and the specification for clarity.

As shown in FIG. 1, a wireless communication device 100 according to the embodiment includes a processor 110. The processor 110 includes an acquisition unit 111, a first determination unit 113 and a second determination unit 115. It should be noted that, although the acquisition unit 111, the first determination unit 113 and the second determination unit 115 are shown in the form of functional modules in the figure, functions of the acquisition unit 111, the first determination unit 113 and the second determination unit 115 may be implemented by the processor 110 as a whole, and are not necessarily implemented by discrete actual components in the processor 110. In addition, although the processor 110 is shown with one block in the figure, the communication device 100 may include multiple processors, and the functions of the acquisition unit 111, the first determination unit 113 and the second determination unit 115 may be distributed in multiple processors, so these functions are implemented by cooperation of the multiple processors.

The acquisition unit 111 is configured to acquire the type of information to be transmitted via a device-to-device communication. The type of the information is one of multiple types which include at least a first type and a second type. Different types may correspond to different requirements on information transfer. For example, information of different types may have different requirements on a time delay, coverage and a detection rate and so on.

According to an embodiment, the type of the information may be predefined based on content of the information. In other words, information with specified content is defined to have a specified type based on a predetermined correspondence. Accordingly, the "acquiring" of the type of the information by the acquisition unit 111 may be determining the type of the information according to the content of the information based on the predetermined correspondence. It should be noted that, the acquisition unit 111 does not necessarily determine the type of the information by recognizing the content of the information, but may determine the type of the information based on a source of the information, or directly obtain the type of information based on an identifier and the like carried in the information, or the like. For example, information from a specific information source may be considered to have specific content, thereby having a specific type. Alternatively, while generating information by an information source, an identifier may be added in the information based on the content of the information or an identifier indicating the type of the information may be directly carried in the information.

As an example of information classification, information may be classified into safety information (a first type) and non-safety information (a second type) based on inherent safety features of the information. For example, as a typical scenario for application of the Internet of things, the D2D communication may include communication between a vehicle and a related entity (V2X communication). The V2X communication may include, for example, vehicle-to-vehicle (V2V) communication, vehicle-to-installation (V2I) communication, vehicle-to-pedestrian (V2P) communication and the like. Information transmission of the V2X may be a broadcast or a unicast. Taking a V2X application as an example, safety information may include, for example, an emergency vehicle alarm, a collision danger alarm, an auxiliary prompt for lane-switching decision, a road danger/construction prompt, cooperation information for automatic vehicle-driving, and the like, which has a high requirement on a time delay, coverage and a detection rate and the like. The non-safety information may include, for example, mobility information, information on convenience and the like, which has a lower requirement on the above aspects for information transfer as compared with the safety information. However, the classification manner of safety information and non-safety information is not limited to information involved in the V2X application, and the above classification manner can be adopted as long as the D2D communication involves information with a safety feature. It should be noted that, Proximity Services-based Direct Communication (ProSe Direct Communication) is introduced in the current version 12 of 3GPP LTE-A standard specification, in which direct communication between user equipments is defined as the mode of ProSe Direction Communication. Therefore, the D2D communication described in the present disclosure contains the ProSe Direct Communication, that is, D2D communication implemented under the LTE-A standard.

In addition, in different scenarios, information with the same content may have different requirements on the coverage and detection rate and the like. Still taking a V2X application as an example, highway exit charge information may have different requirements on the coverage and the detection rate in a scenario of a high vehicle density and in a scenario of a low vehicle density.

Accordingly, according to an embodiment, the type of information is predefined based on both the content of the information and a scenario in which the information is to be sent.

Still referring to FIG. 1, the first determination unit 113 is configured to determine a resource utilization manner for transmitting information at least based on the type of the information. In other words, the resource utilization manner for transmitting the information is determined in consideration of the type of the information, but the type of the information may not be a unique factor for determining the resource utilization manner.

In the existing D2D communication, a resource utilization manner is determined without considering the type of D2D information. With the solution of the present disclosure, the resource utilization manner for transmitting information is determined for different types of information, thereby more reasonably using resources for information transmission. For example, as described in conjunction with embodiments below, a resource utilization manner may be determined for safety information to achieve a high transmission performance of the safety information, such as small interference and high signal reception strength.

Besides, the second determination unit 115 is configured to determine a power control manner for transmitting information at least based on the type of the information. In other words, the power control manner for transmitting the information is determined in consideration of the type of the information, but the type of the information may not be a unique factor for determining the power control manner.

The existing D2D power control is made without considering a requirement on a D2D information transmission quality, hence is not adapted to the characteristic of different transmission quality requirements. With the solutions of the present disclosure, power control manner for transmitting information is determined for information of different types, thereby the information of respective types can be transmitted with more reasonable powers, and a time delay caused by, for example, a power control process when an information type is switched can be reduced.

Next, some embodiments will be described, in which a resource utilization manner for transmitting information is determined based on the type of the information, and a power control manner for transmitting the information is determined based on the type of the information.

According to an embodiment, the first determination unit 113 is configured to select a communication resource for transmitting information of a first type, from dedicated communication resources which are only used for device-to-device communication. In other words, the information of the first type is transmitted over a dedicated frequency, thereby avoiding same frequency interference. As described above, the information of the first type is, for example, safety information.

Preferably, frequency spectrum resources orthogonal to one another in the dedicated communication resources may be allocated for transmission of different information of the first type, thereby reducing interference between the transmitted different information of the first type.

In addition, the first determination unit 113 may be configured to select a communication resource for transmitting information of the second type from shared communication resources. The shared communication resource can be used for the D2D communication and communication between a base station and a user equipment. As described above, the information of the second type is, for example, non-safety information. However, the present disclosure is not limited to the classification manner of the safety information and non-safety information, and may include various other classification manners. The first type and the second type correspond to information having different transmission priorities respectively.

According to an example, the first determination unit 113 may be configured to select a communication resource for transmitting the information of the second type from reserved communication resources in the shared communication resources. As compared with the communication between the base station and the user equipment, the D2D communication can have a priority in using the reserved communication resource.

In the following, an example of a communication resource utilization manner determined by the first determination unit 113 will be described in conjunction with schematic diagrams of FIG. 14 and FIG. 15.

Figure 14:
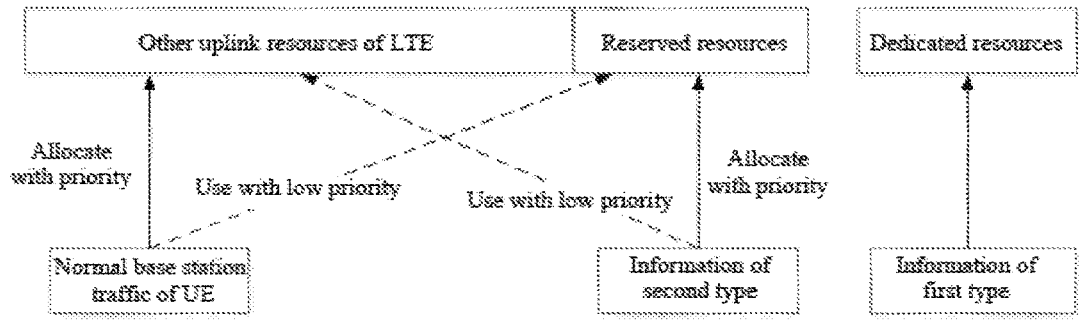
FIG. 14 is a schematic diagram for illustrating an example of a resource utilizing manner for information of different types.
Figure 15:
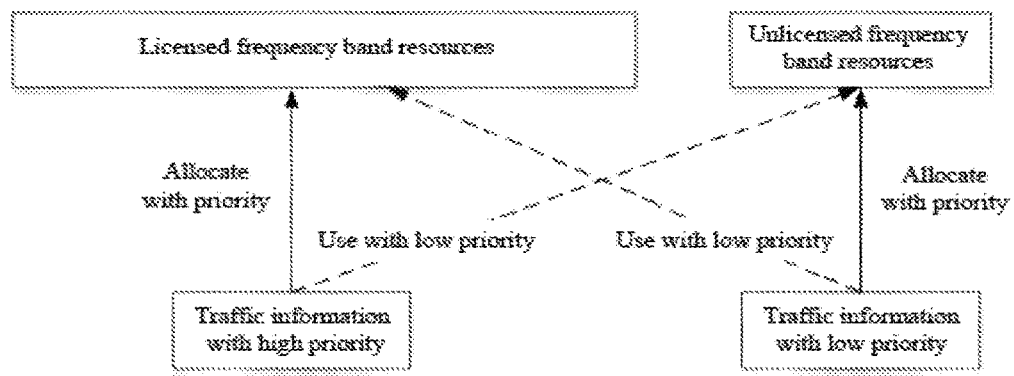
FIG. 15 is a schematic diagram for illustrating another example of resource utilizing manner.

FIG. 14 and FIG. 15 show limited resource utilization solutions involved in the embodiments of the present disclosure, in which reserved resources are limitedly allocated based on features having different resource requirements such as different service priorities or different service quality requirements.

Specifically, as shown in FIG. 14, a dedicated resource is allocated to information of the first type, such as safety information. A reserved resource can be used by a wireless communication device such as a V2X device according to the embodiment and can also be used by a base station and other user equipments, and an uplink resource may be multiplexed. The V2X device has a higher priority in using the reserved resource. When transmitting information of the second type, the base station may firstly allocate an available reserved resource to the information. For a traffic transmission of the base station, a reserved resource can be allocated for the traffic transmission only if other resources are all unavailable. That is to say, when scheduling resources for transmission between the base station and the user equipment, the base station firstly determines whether other uplink resources of LTE are available, and allocates the reserved resource if the other uplink resources of LTE are all unavailable. In addition, as will be described in detail below, in a certain case, a base station traffic allocated to the reserved resource may be kicked out and allocated with other resources.

Besides, according to an embodiment, the reserved communication resource may include a communication resource of an unlicensed frequency band. The unlicensed frequency band is, for example, a broadcast television frequency band, a WiFi frequency band, a radar frequency band and the like other than a licensed frequency band of a cellular communication network.

In view of that traffics having different requirements on a quality of service have different resource requirements, a licensed frequency band resource may be allocated, with a priority, to a traffic having a high requirement on the quality of service, while an unlicensed frequency band resource may be firstly allocated to a traffic having a low requirement on the quality of service. FIG. 15 shows an exemplary manner in which an unlicensed frequency band resource used by a Licensed Assisted Access (LAA) system is used as a limited reserved resource. In a case of transmitting traffic information having a low requirement on quality of service (QoS) (such as a non-real time data traffic), an unlicensed frequency band resource may be firstly allocated for the transmission with the LAA technology. In the case of transmitting traffic information having a high requirement on QoS (such as a real-time data traffic or information of payment service having a certain requirement on quality of transmission), a frequency resource available for long term evolution (LTE) may be firstly allocated for the transmission; an LAA unlicensed frequency band resource may be allocated for the transmission only if there is no available LTE resource, and once there is an available LTE resource again, it may be switched back to use the LTE frequency resource.

Besides, according to an embodiment, in the case that a reserved communication resource is used, information indicating an occupation on the reserved resource may be generated. The embodiment is described below by referring to FIG. 2.

Figure 2:
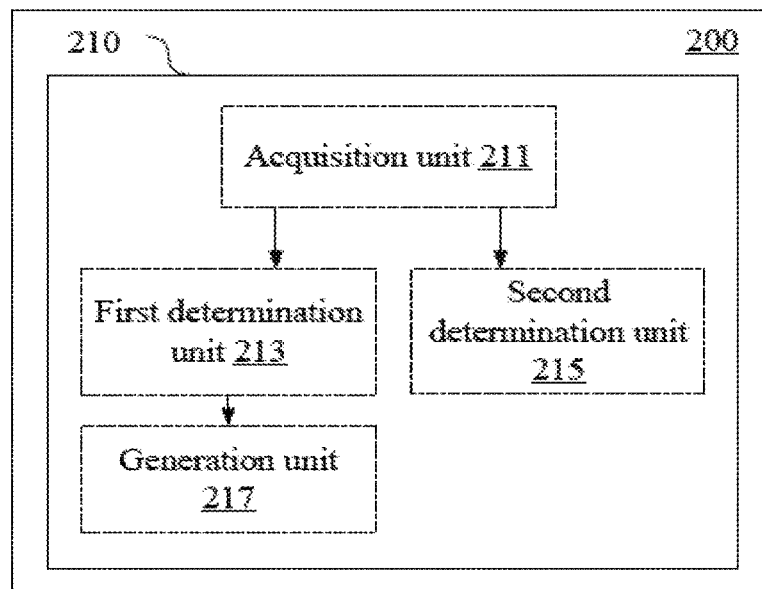
FIG. 2 is a block diagram showing a configuration example of a wireless communication device according to another embodiment of the present disclosure.

As shown in FIG. 2, a wireless communication device 200 according to the embodiment includes a processor 210. The processor 210 includes an acquisition unit 211, a first determination unit 213, a second determination unit 215 and a generation unit 217. Configurations of the acquisition unit 211, the first determination unit 213 and the second determination unit 215 are similar to those of the acquisition unit 111, the first determination unit 113 and the second determination unit 115 described by referring to FIG. 1. The generation unit 217 is configured to generate indication information representing an occupation on a reserved communication resource, in the case that the first determination unit 213 determines to use the reserved communication resource. Based on the indication information, the base station may be indicated not to allocate the occupied resource to other traffic, or kick out a base station traffic that the reserved resource has been allocated for and allocate other resources for the service.

Next, returning to refer to FIG. 1, it is described in conjunction with specific embodiments that the second determination unit 115 determines a power control manner for transmitting information based on the type of the information.

According to an embodiment, the second determination unit 115 may be configured to determine a transmission power for information of the first type as a first predetermined power. The first predetermined power may be a power which is preset and can ensure a predetermined level of coverage and detection rate. By directly setting the transmission power for the information of the first type as a predetermined power, a power control delay can be avoided, meanwhile requirements on the coverage and detection rate can be met. With the configuration, it can be ensured that information having a high requirement on transmission such as safety information is sent timely and effectively. It should be noted that in an existing LTE-A communication standard, for example, a transmission power of a user equipment is dynamically controlled by a base station based on different wireless transmission environments including a path loss, a shadow, fast fading and the like.

In another aspect, the second determination unit 115 may be configured to determine a transmission power for the information of the second type based on a priority of the information. For example, the priority may be associated with coverage and a detection rate of the information.

In the following, description is made by still taking the classification of safety information and non-safety information as an example. Since the non-safety information differs from a base station traffic in a resource utilization priority, the non-safety information may be further divided into two or more sub-levels, such as a level P1 and a level P2. P1 sub-information has a higher frequency utilization priority than the base station traffic and P2 sub-information has a same frequency utilization priority as the base station traffic or a lower frequency utilization priority than the base station traffic. The division of the information levels and some examples are given as follows:

P1 information: has high requirements on coverage and a detection rate among non-safety information, has a higher frequency utilization priority than the base station traffic, and is closely associated with mobility generally, such as information on traffic efficiency improvement, including road speed limit prompt, traffic light prompt, traffic restriction management, parking guide information, turning prohibiting indication and the like.

P2 information: for example other types of information among V2X non-safety information, has a frequency utilization priority same as or lower than that of the base station traffic, such as information on information entertainment service, including a service information announcement, a commercial advertisement, local electronic payment, transaction information and the like, which has a relatively low requirement on coverage and a detection rate.

The above sub-information covers information types of many services, hence different sub-information may be different in the coverage and the detection rate. In order to apply a finer power control to improve a frequency spectrum utilization rate and reduce interference, the above sub-information may be further ranked and classified based on requirements on related parameters such as the coverage and the detection rate. For example, the P2 sub-information may be further divided and represented with a priority i=1, 2, . . . , N, and an example is given as follows:

P2-1: information in the P2 information having high requirements on the coverage and the detection rate, such as a traffic jam alarm;

P2-2: information having lower requirements on the coverage and the detection rate than P2-1, such as transaction payment service information;

. . .

P2-N: information having lowest requirements on the coverage and the detection rate, such as a commercial advertisement.

Next, the requirements on the coverage and the detection rate are described by taking a V2X application as an example.

Coverage and a detection rate in V2X power control is that a determined detection rate α % is required to be reached for a V2X communication within a certain range d.

In the case that non-safety information is transmitted in a V2X, a minimum coverage and detection rate, with which a basic requirement of the information type (P1, P2-1, P2-2, . . . , P2-N) of the non-safety information is met, is determined.

Related Definitions of a Power:

$P_{max}$: a maximum available transmission power of a V2X device, which can meet a requirement on safety information transmission of V2X. For example, the above first predetermined power may be determined as $P_{max}$ for the safety information.

$P_i$: a power-control power corresponding to the information type, which can be calculated with a power control formula. An exemplary way for calculating the power will be described later.

P: a transmission power of the V2X device, which is the transmission power finally adopted.

$P_{min}$: a minimum transmitting power, which is pre-configured for the non-safety information type to meet a minimum requirement on coverage and a detection rate corresponding to the non-safety information type. In the case that the above information classification is adopted, minimum transmitting powers corresponding to respective types may meet the following relationship for example:

$P_{max} > P_{min1} \geq P_{min2\_1} \geq P_{min2\_2} \ldots \geq P_{min2\_N}$, where $P_{min1}$ is a minimum transmitting power for the P1 sub-information, and $P_{min2\_i}$ is a minimum transmitting power for the P2 sub-information corresponding to priority i.

With the wireless communication device according to the embodiments of the present disclosure, corresponding transmitting powers can be determined based on different information types. However, corresponding transmission powers can also be determined based on power control parameters for different information types from a base station.

According to an embodiment, the second determination unit 115 is configured to determine a transmission power for information based on a power control parameter from the base station. The power control parameter is associated with a priority of the information. In other words, in the embodiment, the process of determining the power control parameter based on the classification of the information is performed by base station side, and the power control parameter is notified to a user equipment.

A power control parameter may be separately acquired for a type of information to be transmitted, or power control parameters for multiple types may be acquired together.

According to an embodiment, the second determination unit 115 is configured to determine a transmission power for information based on a power control parameter set from a base station. The power control parameter set includes power control parameters for information with different priorities. With the configuration, a communication load caused by sending power control parameters for multiple times can be effectively reduced, which is particularly effective for an application scenario in which an information transmitting power needs to be determined for multiple times.

Moreover, according to an embodiment, the second determination unit 115 may be further configured to determine a predetermined power as an initial power for transmitting information, for a user equipment to operate, and adjust the transmission power for the information based on a power control parameter from a base station. With the configuration, the initial power can be determined without causing a power control delay, and the transmission power can be subsequently adjusted in response to an indication from the base station.

In the following, an exemplary way for subsequently determining the transmitting power in response to the indication from the base station is described. A transmitting power for information may be determined with the following equation 1:

$$P = \min \begin{cases} P_{cmax,i} \\ P_o + \alpha \cdot PL + 10\lg(M) + \Delta_{MCS} \end{cases} \quad (1)$$

where $P_o$ and $\alpha$ are two adjustable power control parameters configured by an upper layer of the base station, $P_o$ is a cell specific parameter, and $\alpha$ is a path loss compensation parameter. $P_{cmax,i}$ is a maximum effective transmission power over a sub-carrier i of a base station c, and M represents the number of physical resource blocks of a frequency spectrum occupied by a V2X transmission. $\Delta_{MCS}$ is a power offset determined by modulation and encoding schemes defined in the 3rd Generation Partnership Project (3GPP). Here, $\Delta_{MCS}$ may be set as 0, the value of $P_o$ is selected to match with specific modulation and encoding schemes. PL is a path loss, and a user equipment (UE) may obtain the path loss by measuring a reference signal. In an example, the base station may configure a $P_o$ for the V2X communication different from those for other communications. Further, different $P_o$ may be configured based on different information types.

The wireless communication device according to the embodiment of the present disclosure may serve as a user equipment. As aforementioned, the user equipment may be, for example, a vehicle device, and accordingly the transmitted information may be V2X information.

In addition, as aforementioned, the user equipment may determine the transmission power for information of the second type based on the power control parameter from the base station.

Figure 3:
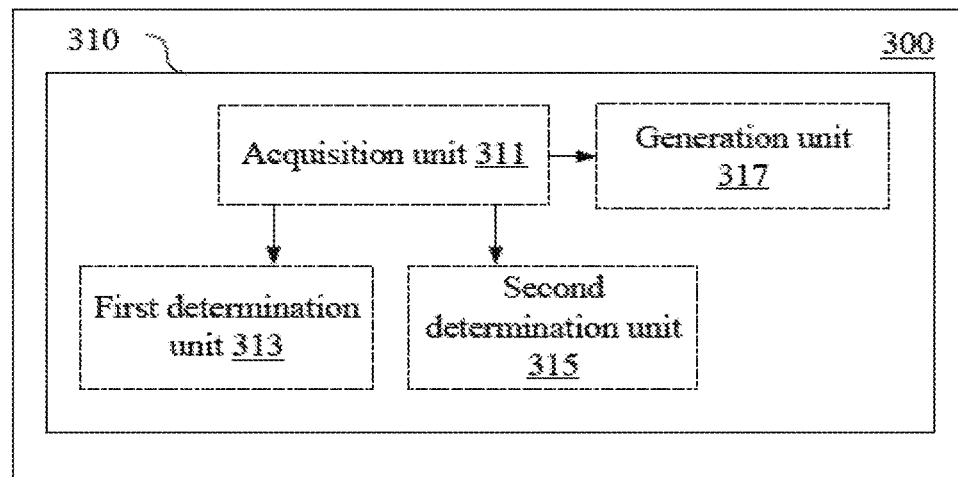
FIG. 3 is a block diagram showing a configuration example of a wireless communication device according to yet another embodiment of the present disclosure.

Accordingly, in an embodiment shown in FIG. 3, a wireless communication device 300 includes a processor 310. The processor 310 includes an acquisition unit 311, a first determination unit 313, a second determination unit 315 and a generation unit 317. Configurations of the acquisition unit 311, the first determination unit 313 and the second determination unit 315 are similar to those of the acquisition unit 111, the first determination unit 113 and the second determination unit 115 which are described above.

The generation unit 317 is configured to generate indication information related to a priority of the information of the second type, in the case that information to be transmitted is the information of the second type. The priority of the information may be predefined based on content of the information, such as the aforementioned P2-1 to P2-N.

The indication information generated by the generation unit 317 may be sent to the base station for determining a corresponding power control parameter.

Figure 4:
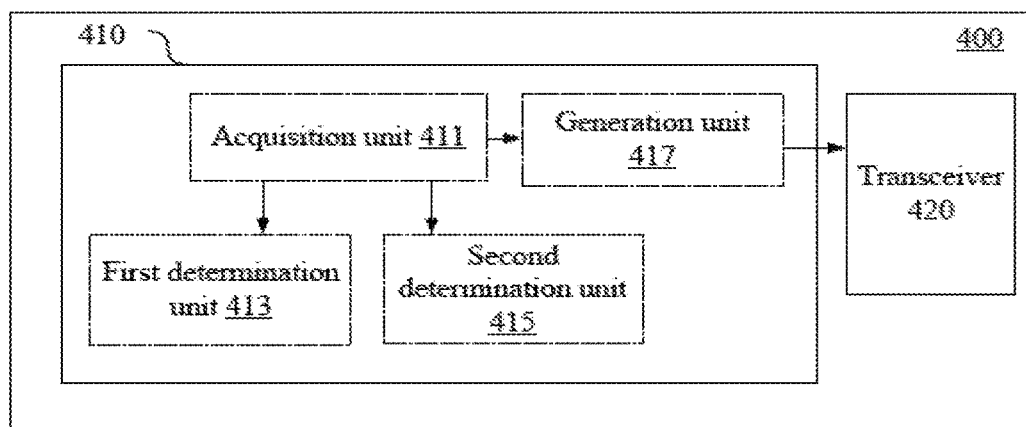
FIG. 4 is a block diagram showing a configuration example of a wireless communication device according to still another embodiment of the present disclosure.

Accordingly, as shown in FIG. 4, a wireless communication device 400 according to an embodiment includes a processor 410. The processor 410 includes an acquisition unit 411, a first determination unit 413, a second determination unit 415 and a generation unit 417. Configurations of the acquisition unit 411, the first determination unit 413, the second determination unit 415 and the generation unit 417 are similar to those of corresponding units which are described above. In addition, the wireless communication device 400 further includes a transceiver 420. The transceiver 420 is configured to send indication information generated by the generation unit 417 to a base station via a physical uplink control channel (PUCCH).

Figure 5:
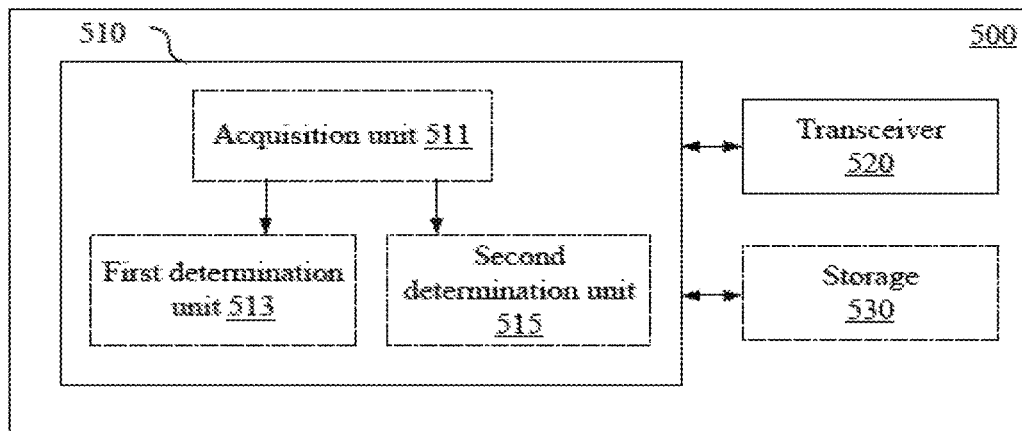
FIG. 5 is a block diagram showing a configuration example of a wireless communication device according to another embodiment of the present disclosure.

FIG. 5 shows a configuration example of a wireless communication device 500 according to another embodiment. The wireless communication device 500 includes a processor 510 and a transceiver 520. The processor 510 includes an acquisition unit 511, a first determination 513 and a second determination unit 515, configurations of which are respectively similar to those of the aforementioned acquisition units, first determination units and second determination units. The transceiver 520 is configured to receive radio resource control (RRC) signaling from a base station. The radio resource control signaling carries a power control parameter for a user to transmit information, such as the above $P_o$ and $\alpha$. In the embodiment, a transmission power for information in D2D communication is determined based on the power control parameter from the base station. In a preferred example, the RRC signaling sent by the base station contains multiple groups of power control parameters for different information types. In a case where the type of information to be transmitted is changed, the user equipment can timely determine a reasonable transmission power for operation without waiting a power control parameter to be retransmitted by the base station.

In addition, although not shown in the figure, the processor 510 may further include a unit similar to the generation unit 417 described with reference to FIG. 4, for generating indication information on a priority of information of the second type. However, in some embodiments, the generation unit is unnecessary. For example, in the case that the transmission power for the information is determined based on the power control parameter set (such as the above multiple groups of power control parameters) received from the base station (where the power control parameter set includes power control parameters for information with different priorities), it is unnecessary to send indication information on a priority of specific information to the base station.

As shown in FIG. 5, optionally, the wireless communication device 500 may further include a storage 530 configured to store the power control parameter sent from the base station. The power control parameter stored in the storage 530 is used, for example, in the case that the type of information to be sent is changed, a corresponding power control parameter may be determined based on the contents stored in the storage, thereby reducing a communication overhead caused by requesting the power control parameter from the base station.

Figure 16:
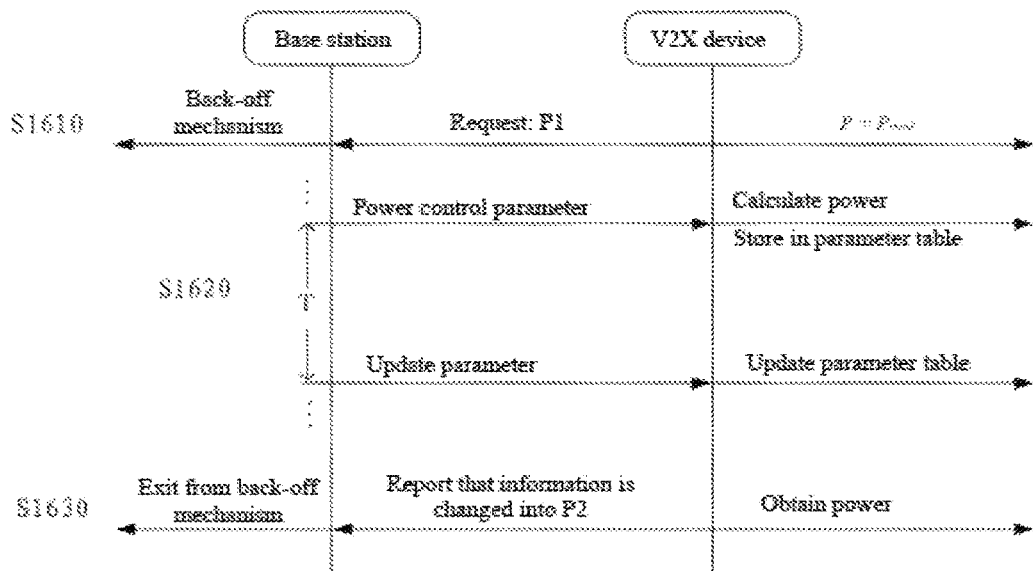
FIG. 16 is a flowchart illustrating an process example of a power control manner for information of different types.
Figure 17:
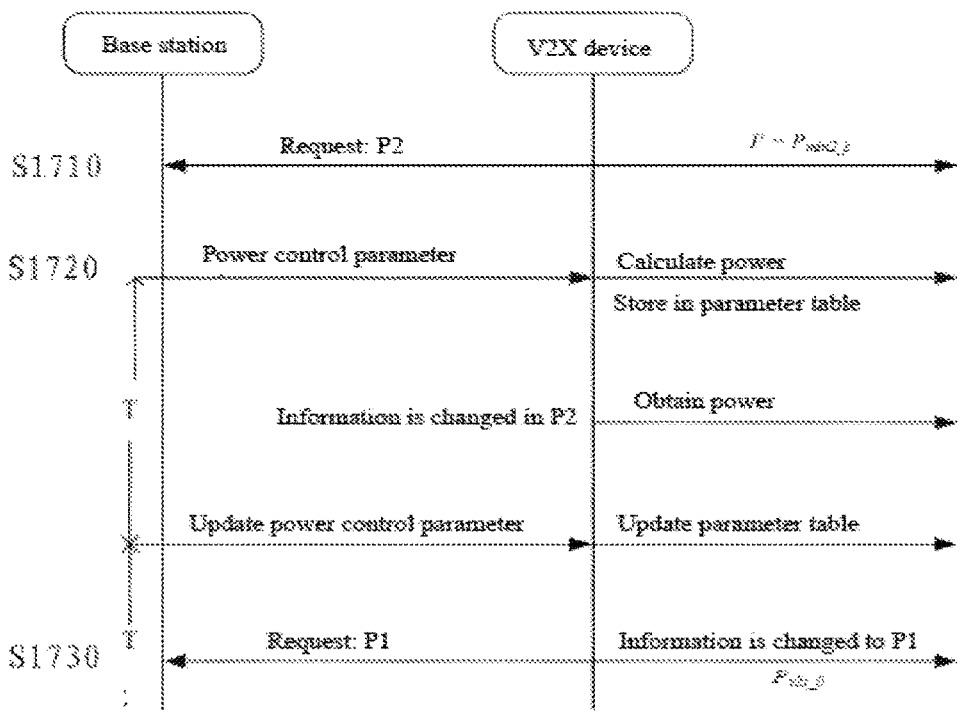
FIG. 17 is a flowchart for illustrating another process example of a power control manner.

Next, examples of resource scheduling and power control for information of P1 type and information of P2 type which are taken as exemplary information types are respectively described in conjunction with FIG. 16 and FIG. 17, in which, a V2X device is taken as an example of a wireless communication device. However, it should be understood that, the present disclosure is not limited to details in the following example.

As shown in FIG. 16, when the V2X device is to transmit P1 sub-information, a process of resource scheduling and power control is as follow.

In step S1610, when initially transmitting the P1 sub-information, the V2X device firstly selects a resource from a reserved resource pool of a shared resource pool, and adopts a predefined power $P_{min1}$ as an initial transmission power. Here, the initial transmitting power is adopted for transmission firstly instead of obtaining a power control parameter from the base station and then transmitting with a power-control power, thereby reducing an interaction time delay. Then, the base station may re-configure a resource and a transmission power for the device.

Meanwhile, a power control and resource request is sent to the base station. The request information, for example, may contain one bit information for representing whether information being currently transmitted is P1 sub-information. For example, one bit in uplink control information (UCI) in the PUCCH is used for indicting whether current information is P1 sub-information.

After receiving the request information, the base station learns that the V2X device currently transmits the P1 sub-information. Since the P1 sub-information has a higher frequency utilization priority than a normal base station traffic, the base station may start a back-off mechanism. An example of the back-off mechanism is as follows.

If there is currently a normal base station UE using a same uplink frequency resource as the V2X device, the UE will be allocated with other available frequency resources (the above mentioned kicking out), so that the part of uplink frequency resource is dedicated for the V2X device. Meanwhile, the part of uplink frequency resource is labeled as temporally non-sharable and cannot be re-shared until the base station exits from the back-off mechanism.

Next, in step S1620, the base station configures parameters for all information types (including P1 sub-information and P2 sub-information) of non-safety information, such as $\alpha$ and a group of $P_{0i}$ (i=0, 1, 2, . . . , N), based on a requirement on a signal to interference plus noise ratio and requirements on coverage and a detection rate for different information types.

The V2X device receives a power control parameter sent by the base station, and for example, may obtain a path loss (PL) in the following manner:

the base station calculates PL based on information sent by the V2X device, for example a sounding reference signal (SRS), and then the base station sends the PL to the V2X device as a power control parameter; or the V2X device calculates the PL based on a reference signal (RS).

The path loss parameter is not required in the case that $\alpha$ is set as zero. The V2X device obtains values of multiple groups of parameters $P_{0i}$ and $\alpha$, then calculates power-control power based on the above equation (1), and may store related parameters in a parameter table such as the following table 1.

TABLE 1

|  | P1 | P2-1 | P2-2 | ... | P2-N |
|---|---|---|---|---|---|
|  | $P_{0_1}$ | $P_{0_0}$ | $P_{0_1}$ | $P_{0_2}$ | $P_{0_N}$ |
|  | $\alpha$ | $\alpha$ | $\alpha$ | $\alpha$ | $\alpha$ |
|  | $P_{v2x_1}$ | $P_{v2x_0}$ | $P_{v2x_1}$ | $P_{v2x_2}$ | $P_{v2x_N}$ |

The power-control power of the V2X device transmitting the P1 sub-information is $P_{v2x\_0}$, and the transmission power is selected based on the following equation (2):

$$P = \begin{cases} P_{v2x\_j} & P_{v2x\_j} \leq P_{max} \\ P_{max} & P_{v2s\_j} > P_{max} \end{cases} \quad (2)$$

The base station may update, once for every time duration T, the power control parameters $P_{0i}$ and $\alpha$ for the V2X device transmitting the information. Then, the V2X device can update the parameter table accordingly and obtains a new transmission power.

In the case that the information to be transmitted by the V2X device is changed into P2 sub-information (S1630), a power-control power for the information can be directly obtained from the parameter table. Preferably, in the case that the path loss changes rapidly, a power control parameter for the information may be obtained from the parameters and the power-control power is calculated based on the path loss measured currently. Then, a transmission power is selected based on the equation (2). Resources used by the original information are used continuously. Meanwhile, it is reported to the base station that P2 sub-information is currently transmitted. The base station re-allocates resources to the P2 sub-information, thereby reducing a time overhead.

After receiving the information, the base station learns that the V2X device no longer transmits the P1 sub-information and may exit from the back-off mechanism, so that the part of labeled frequency resource can be re-multiplexed by the base station UE.

As shown in FIG. 17, in the case that the V2X is to transmit the P2 sub-information, a process of resource scheduling and power control is as follow.

In S1710, when initially transmitting the P2 sub-information, the V2X device firstly selects a resource from a reserved resource pool of a shared resource pool, and adopts a predefined power $P_{min2\_i}$ as an initial transmission power. Here, the initial transmitting power is adopted for transmission firstly, instead of obtaining a power control parameter from the base station and then transmitting with the power-control power, thereby reducing an interaction time delay. Then, the base station may re-configure a resource and a transmission power for the device.

Meanwhile, a power control and resource request is sent to the base station by the V2X device. The request information, for example, may contain one bit for representing whether the information being currently transmitted is P2 sub-information, for example:

one bit in UCI in the PUCCH is used for indicting whether the information being currently transmitted is P2 sub-information.

Next, in S1720, after receiving the request information, the base station learns that the V2X device currently transmits the P2 sub-information. The base station configures parameters for all information types (including P1 sub-information and P2 sub-information) of non-safety information, such as a group of $P_{0i}$ (i=0, 1, 2, ..., N) and a α, based on a requirement on a signal to interference plus noise ratio and requirements on coverage and a detection rate for different information types. A reference solution of parameter configuration is described below.

The path loss compensation parameter α has a configuration manner same as a traditional configuration manner of LTE. Alternatively, α may also be directly set as zero. The parameter $P_{0i}$ can be determined based on equation (3) and equation (4).

$$P_{0\_i} = P_{0\_NOMINAL\_PUSCH} + P_{0\_Device} \quad (3)$$

$$P_{0\_Device} = \mu \cdot P_{0\_Normal\_UE} + \eta \cdot P_{0\_V2X\_D} \quad (4)$$

where $P_{0\_NOMINAL\_PUSCH}$ is a cell nominal power which is broadcasted via an SIB2 system message (UplinkPowerControlCommon), $P_{0\_Device}$ is a nominal power offset obtained based on interference from the base station side and a V2X information request, and may be calculated with equation (4). $P_{0\_Normal\_UE}$ is a nominal power offset meeting a current acceptable interference requirement of the base station, $P_{0\_V2X\_D}$ is a nominal power offset calculated based on requirements on coverage and a detection rate of the V2X information, μ and η are corresponding weighting factors, where 0≤μ,η≤1 and μ+η=1. The values of the weighting factors may be adjusted as needed. In this way, there may be multiple groups of parameters $P_{0\_Device}$ for different V2X information types. The multiple groups of parameters each may be sent to the UE via dedicated signaling such as RRC signaling (an information element UplinkPowerControlDedicated in the RRC signaling). The UE then calculates $P_{0i}$ based on equation (3). The dedicated signaling may be carried by a data channel such as PUSCH. It should be understood that, as aforementioned, the base station may also explicitly notify the UE of multiple $P_{0i}$ via the RRC signaling The base station may transmit one α parameter and a group of $P_{0i}$ parameters to the V2X device in the above way.

The V2X device receives a power control parameter sent by the base station, and the path loss PL may be determined in the following manner:

the base station calculates PL based on information sent by the V2X device such as SRS, and then sends the PL to the V2X device as a power control parameter; or the V2X device calculates the PL based on RS.

The path loss parameter is not required in the case that α is set as zero. The V2X device obtains values of multiple groups of parameters $P_{0i}$ and one α. Then power-control power is calculated with equation (1), and related parameters are stored in the parameter table. The stored parameter may be determined as needed.

The V2X device can obtain a power-control power $P_{v2vj}$ corresponding to a P2-j sub-information type from the parameter table. The P2 sub-information has a lower priority than the base station traffic, hence a transmission power for the P2 sub-information is selected based on the above equation (2).

The base station may update, once for every time duration T, the power control parameters $P_{0i}$ and α for the V2X device transmitting the information. Then, the V2X device updates the parameter table and obtains a new transmission power based on equation (2).

In the case that current transmission information of the V2X device is changed within the P2 sub-information, a corresponding power-control power may be directly obtained from the parameter table. Preferably, in the case that the path loss changes rapidly, a corresponding power control parameter may be obtained from the parameter table and the power-control power is calculated from a current newly-measured path loss. Then, a transmission power is selected. Here, it is unnecessary to request the power control parameter from the base station, thereby saving the time and reducing resource overheads for signaling transmission.

In the case that the type of the V2X transmission information is changed and P1 sub-information needs to be transmitted (S1730), a power-control power $P_{v2x_0}$ for the P1 sub-information may be directly obtained from a storage table. Preferably, in the case that the path loss changes rapidly, a power control parameter may be obtained from the parameter table and a power-control power is calculated from a current newly-measured path loss. In addition, resources for the original information are used continuously, and it is reported to the base station that the P1 sub-information is currently transmitted. The base station re-allocates resources for the P1 sub-information, thereby reducing a time overhead.

It is apparent that some methods and processing are also disclosed in the description of the embodiments of the wireless communication device above. Below, a wireless communication method according to an embodiment of the present disclosure is described without repeating some details described above.

Figure 6:
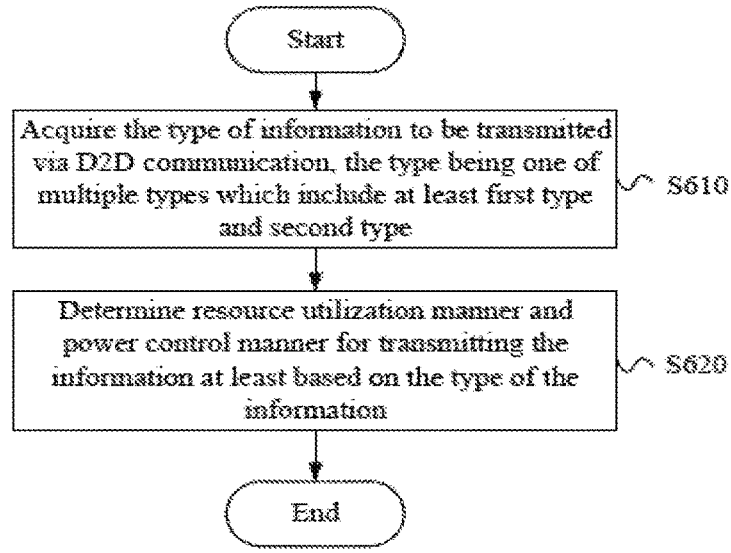
FIG. 6 is a flowchart showing a process example of a wireless communication method according to an embodiment of the present disclosure.

As shown in FIG. 6, a wireless communication method according to the embodiment includes a step S610 of acquiring the type of information to be transmitted via a device-to-device communication. The type is one of multiple types which include at least a first type and a second type. As described above, information of different types may have different requirements on information transfer, for example, have different requirements on a time delay, coverage and a detection rate and the like. The type of the information may be predefined based on content of the information. More particularly, information of the first type may be safety information and information of the second type may be non-safety information.

The method further includes a step S620 of determining a resource utilization manner and a power control manner for transmitting the information at least based on the type of the information.

The method may be performed at user equipment (such as V2X device) side, or may be performed at base station side.

Alternatively, the above steps may be respectively performed at the user equipment side and the base station side.

Next, a configuration example of a wireless communication device at base station side according to an embodiment of the present disclosure is described. It should be noted that, some processing for resource scheduling and power control at the base station side has been described in the descriptions of the above embodiments. Hereinafter, a wireless communication device at base station side according to the embodiment of the present disclosure is described without repeating some details which have been described.

Figure 7:
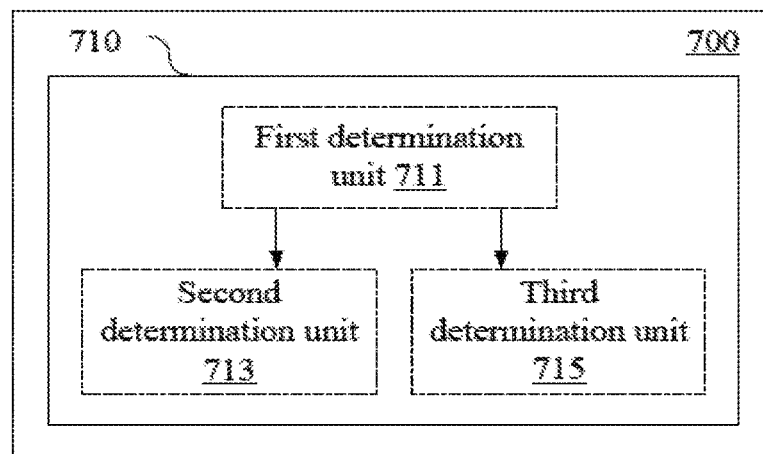
FIG. 7 is a block diagram showing a configuration example of a wireless communication device for base station side according to an embodiment of the present disclosure.

As shown in FIG. 7, a wireless communication device 700 for base station side according to an embodiment includes a processor 710. The processor 710 includes a first determination unit 711, a second determination unit 713 and a third determination unit 715.

The first determination unit 711 is configured to determine the type of information to be transmitted by a user equipment via a device-to-device communication, based on indication information from the user equipment. The type is one of multiple types which include at least a first type and a second type. Information of different types may have different requirements on information transfer, for example, have different requirements on a time delay, coverage and a detection rate and the like. The type of the information may be predefined based on content of the information. More particularly, information of the first type may be safety information and information of second type may be non-safety information.

The second determination unit 713 is configured to determine a resource scheduling manner for a user equipment to transmit the information, based on the type acquired by the first determination unit 711.

The third determination unit 715 is configured to determine a power control manner for the user equipment to transmit the information, based on the type acquired by the first determination unit 711.

According to an embodiment, the second determination unit 713 may be configured to select a communication resource for transmitting the information of the first type from dedicated communication resources. The dedicated communication resource is only used for device-to-device communication.

In addition, the second determination unit 713 may be configured to, for the information of the first type, allocate frequency spectrums orthogonal to one another for different user equipments, thereby reducing interference between transmissions of different information of the first type.

According to an embodiment, the second determination unit 713 may be configured to select a communication resource for transmitting the information of the second type from shared communication resources. The shared communication resource can be used for the device-to-device communication and communication between a base station and a user equipment.

In addition, the second determination unit 713 may be further configured to select a communication resource for transmitting the information from a reserved communication resource in the shared communication resources. The reserved communication resource is allocated for the device-to-device communication with a priority as compared to base station communication traffic.

As described above, in the case that the user equipment uses the reserved communication resource, a base station traffic for which the reserved communication resource is allocated may be kicked out and allocated with other resources.

Figure 8:
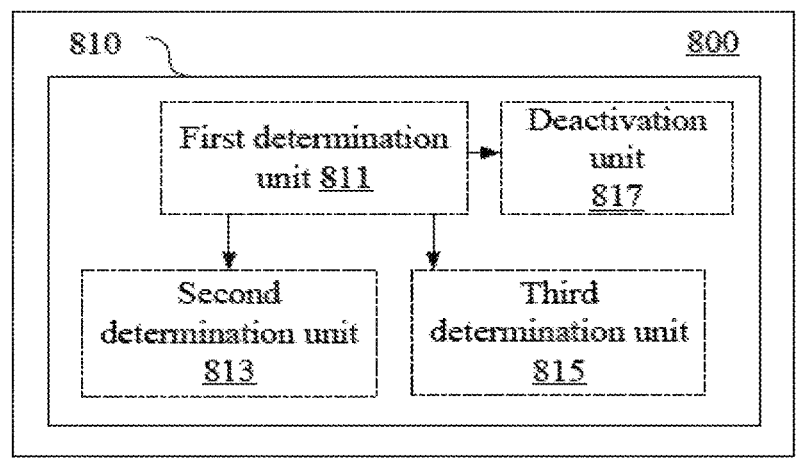
FIG. 8 is a block diagram showing a configuration example of a wireless communication device for base station side according to another embodiment of the present disclosure.

Accordingly, as shown in FIG. 8, a wireless communication device 800 for base station side according to an embodiment includes a processor 810. The processor 810 includes a first determination unit 811, a second determination unit 813, a third determination unit 815 and a deactivation unit 817. Configurations of the first determination unit 811, the second determination unit 813 and third determination unit 815 are similar to those of the first determination unit 711, second determination unit 713 and third determination unit 715 described with reference to FIG. 7. The deactivation unit 817 is configured to stop communication traffic of the base station from using a reserved communication resource, if the indication information from a user equipment indicates that the user equipment is to use the reserved communication resource. Specifically, the deactivation unit 817 may, for example, generate an instruction for stopping the communication traffic of the base station from using the reserved communication resource.

Returning to refer to FIG. 7, according to an embodiment, the third determination unit 715 may be configured to determine a priority of information of the second type based on the indication information from the user equipment, and determine a power control parameter of the information based on the priority.

According to another embodiment, the third determination unit 715 may be configured to determine a power control parameter set for information of the second type. The power control parameter set includes power control parameters for information with different priorities. With the configuration, a communication load caused by sending power control parameters for multiple times can be effectively reduced.

Moreover, although not shown in the figure, the wireless communication device for the base station side according to an embodiment may include a transceiver. For example, the transceiver is configured to receive indication information sent by a user equipment via PUCCH and send RRC signaling to the user equipment.

Figure 9:
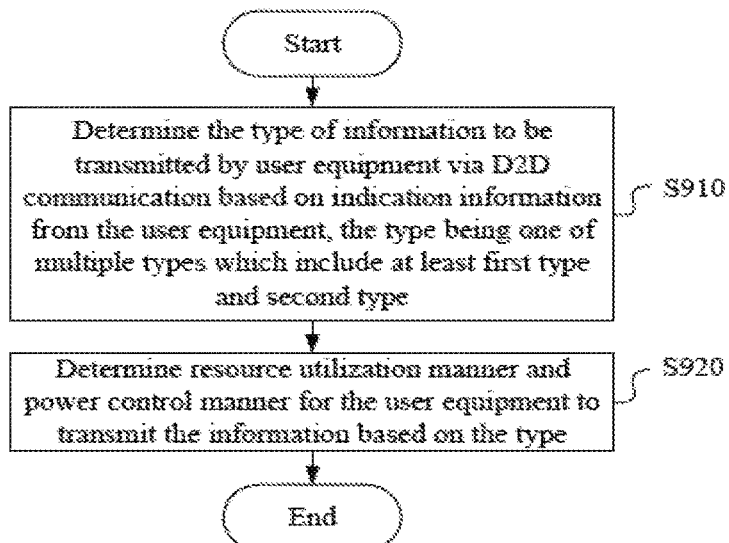
FIG. 9 is a flowchart showing a process example of a wireless communication method for base station side according to an embodiment of the present disclosure.

FIG. 9 shows a process example of a wireless communication method for base station side according to an embodiment of the present disclosure.

In step S910, the type of information to be transmitted by a user equipment via device-to-device communication is determined based on indication information of the user equipment. The type is one of multiple types which include at least a first type and a second type. Information of different types may have different requirements on information transfer, for example, have different requirements on a time delay, coverage and a detection rate and the like. The type of the information may be predefined based on content of the information. More particularly, information of the first type may be safety information and information of the second type may be non-safety information.

In step S920, a resource scheduling manner and a power control manner for the user equipment to transmit the information is determined based on the type.

Figure 18:
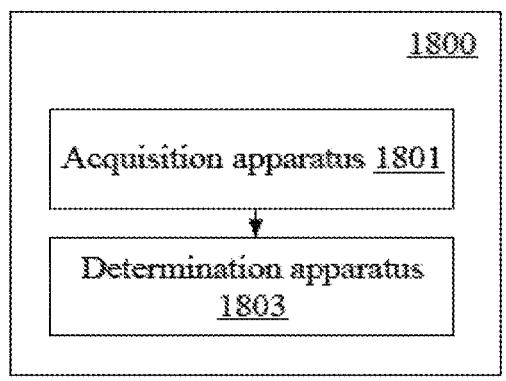
FIG. 18 is a block diagram showing a configuration example of a wireless communication device according to an embodiment of the present disclosure.
Figure 19:
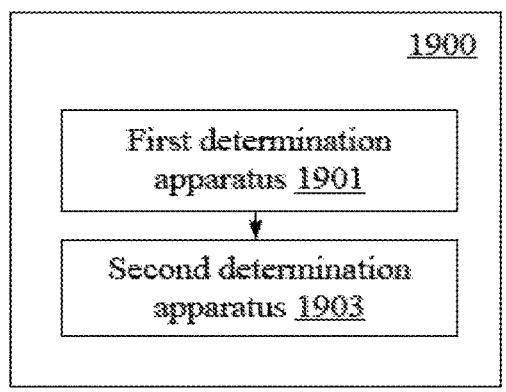
FIG. 19 is a block diagram showing a configuration example of a wireless communication device for base station side according to an embodiment of the present disclosure.

In addition, embodiments of the present disclosure also include a wireless communication device shown in FIG. 18 and a wireless communication device shown in FIG. 19.

As shown in FIG. 18, a wireless communication device 1800 according to an embodiment includes an acquisition apparatus 1801 and a determination apparatus 1803.

The acquisition apparatus 1801 is configured to acquire the type of information to be transmitted via a device-to-device communication. The type is one of multiple types which include at least a first type and a second type.

The determination apparatus 1803 is configured to determine a resource utilization manner and a power control manner for transmitting the information, at least based on the type of the information.

As shown in FIG. 19, a wireless communication device 1900 for base station side according to an embodiment includes a first determination apparatus 1901 and a second determination apparatus 1903.

The first determination apparatus 1901 is configured to acquire the type of information to be transmitted by a user equipment via a device-to-device communication, based on indication information from the user equipment. The type is one of multiple types which include at least a first type and a second type.

The second determination apparatus 1903 is configured to determine a resource scheduling manner and a power control manner for the user equipment to transmit the information, based on the type.

As examples, the steps of the above methods and the modules and/or units of the above devices can be realized by software, firmware, hardware or combinations thereof. In the case where the present disclosure is realized by software or firmware, a program constituting the software implementing the above methods is installed in a computer with a dedicated hardware structure (e.g. a general computer 1000 shown in FIG. 10) from a storage medium or network, where the computer is capable of implementing various functions when installed with various programs.

Figure 10:
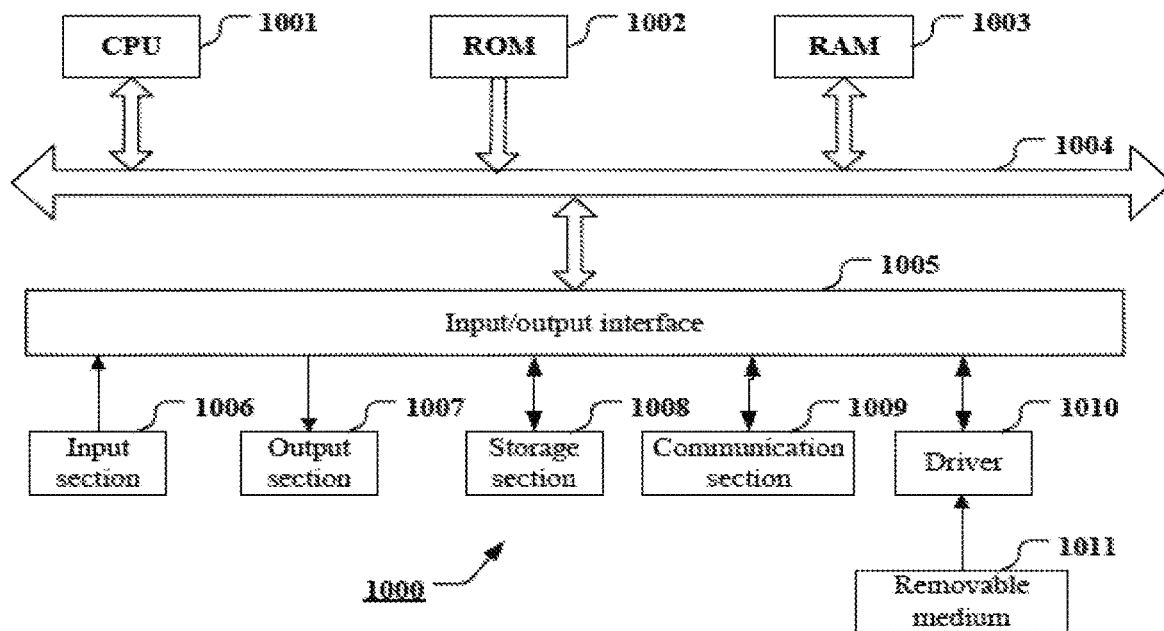
FIG. 10 is a block diagram showing an exemplary structure of a computer which implements the method and device according to the present disclosure.

In FIG. 10, a central processing unit (CPU) 1001 executes various processing in response to a program stored in a read-only memory (ROM) 1002 or a program loaded to a random access memory (RAM) 1003 from a storage section 1008. The data for the various processing of the CPU 1001 may be stored in the RAM 1003 as needed. The CPU 1001, ROM 1002 and RAM 1003 are linked with each other via a bus 1004. An input/output interface 1005 is also linked to the bus 1004.

The following components are linked to the input/output interface 1005: an input section 1006 (including a keyboard, a mouse and the like), an output section 1007 (including displays such as a cathode ray tube (CRT), a liquid crystal display (LCD), a speaker and the like), a storage section 1008 (including a hard disc and the like), and a communication section 1009 (including a network interface card such as a LAN card, a modem and the like). The communication section 1009 performs communication processing via a network such as the Internet. A driver 1010 may also be linked to the input/output interface 1005 as needed. A removable medium 1011 such as a magnetic disc, an optical disc, a magnetic optical disc and a semiconductor memory may be installed in the driver 1010 as needed, so that the computer program read therefrom is installed in the storage section 1008 as appropriate.

In the case where the foregoing series of processing is achieved with software, programs forming the software are installed from a network such as the Internet or a storage medium such as the removable medium 1011.

It should be appreciated by those skilled in the art that the storage medium is not limited to the removable medium 1011 shown in FIG. 10, which has program stored therein and is distributed separately from the apparatus so as to provide the programs to users. The removable medium 1011 may be, for example, a magnetic disc (including a floppy disc (registered trademark)), a compact disc (including a compact disc read-only memory (CD-ROM) and a digital versatile disc (DVD)), a magneto optical disc (including a mini disc (MD) (registered trademark)), and a semiconductor memory. Alternatively, the storage medium may be the hard discs included in the ROM 1002 and the storage section 1008 in which programs are stored, and can be distributed to users along with the device in which they are incorporated.

In addition, a program product storing machine-readable instruction codes is further provided according to the embodiments of the present disclosure. The method according to the above embodiments of the present disclosure can be performed when the instruction codes is read and executed by a machine Accordingly, a storage medium for carrying the program product in which machine-readable instruction codes are stored is also provided in the present disclosure. The storage medium includes but is not limited to a floppy disc, an optical disc, a magnetic optical disc, a memory card, a memory stick and the like.

The embodiments of the present disclosure may further relate to the following electronic device. In the case that the electronic device is applied at base station side, the electronic device may be implemented as any types of evolved node B (eNB), such as a macro eNB and a small eNB. The small eNB may be an eNB of a cell having a smaller coverage than the macro cell, such as a pico-cell eNB, a micro eNB and a home (femto) eNB. Alternatively, the electronic device may be implemented as any other types of base stations, such as a NodeB and a base transceiver station (BTS). The electronic device may include a main body (also referred to a base station device) configured to control wireless communication, and one or more remote radio heads (RRHs) arranged at a position different from a position of the main body. In addition, various types of terminals to be described below can operate as a base station by temporarily or semi-persistently performing a function of the base station.

When being applied at a user equipment side, the electronic device may be implemented as a mobile terminal (such as a smart phone, a panel personnel computer (PC), a laptop PC, a portable game terminal, a portable/dongle mobile router and a digital camera) or a vehicle terminal (such as an automobile navigation device). In addition, the electronic device may be a wireless communication module (such as an integrated circuit module including one or more wafers) mounted on each of the above terminals.

Application Examples of a Terminal Device

Figure 11:
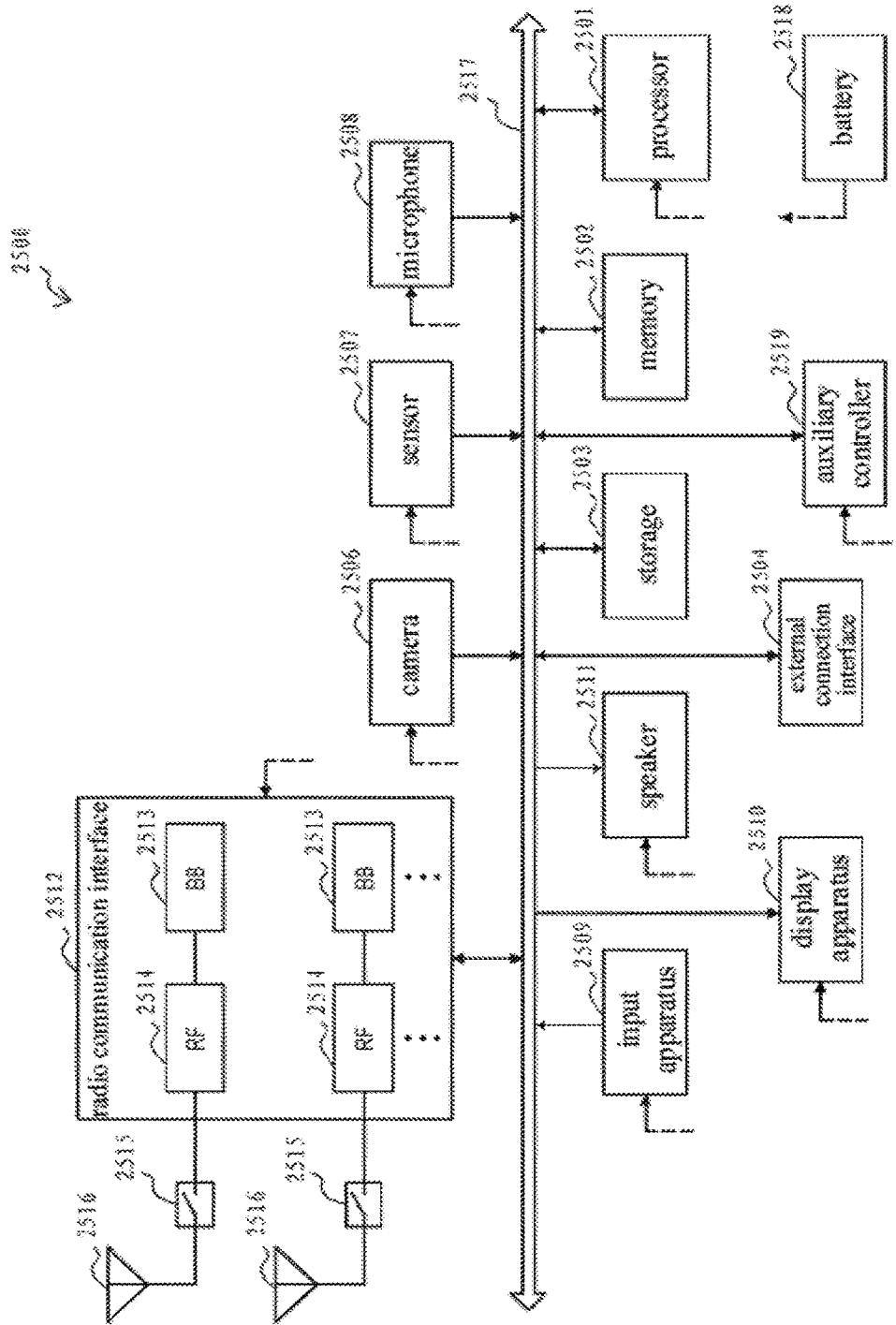
FIG. 11 is a block diagram showing an example of an illustrative configuration of a smart phone to which a technology according to the present disclosure can be applied.

FIG. 11 is a block diagram showing an example of a schematic configuration of a smart phone 2500 to which the technology according to the present disclosure may be applied. The smart phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518 and an auxiliary controller 2519.

The processor 2501 may be for example a CPU or a system on chip (SoC), and controls functions of an application layer and an additional layer of the smart phone 2500. The memory 2502 includes RAM and ROM, and stores programs executed by the processor 2501 and data. The storage 2503 may include a storage medium such as a semiconductor memory and a hard disk. The external connection interface 2504 refers to an interface connecting an external device (such as a memory card and a universal serial bus (USB) device) to the smart phone 2500.

The camera 2506 includes an image sensor (such as a charge-coupled device (CCD) and a complementary metal oxide semiconductor (CMOS)), and generates a captured image. The sensor 2507 may include a group of sensors such as a measurement sensor, a gyroscope sensor, a geomagnetic sensor and an acceleration sensor. The microphone 2508 converts voice inputted to the smart phone 2500 into an audio signal. The input apparatus 2509 includes for example a touch sensor configured to detect touch on a screen of the display apparatus 2510, a keypad, a keyboard, a button or a switch, and receives an operation or information inputted by the user. The display apparatus 2510 includes a screen (such as a liquid crystal display (LCD) and an organic light-emitting diode (OLED) display), and displays an output image of the smart phone 2500. The speaker 2511 converts the audio signal outputted from the smart phone 2500 into voice.

The radio communication interface 2512 supports any cellular communication scheme (such as LTE and LTE-advanced), and performs wireless communication. The radio communication interface 2512 may generally include for example a baseband (BB) processor 2513 and a radio frequency (RF) circuit 2514. The BB processor 2513 may perform for example coding/decoding, modulation/demodulation and multiplexing/demultiplexing, and perform various types of signal processing for wireless communication. Meanwhile, the RF circuit 2514 may include for example a frequency mixer, a filter and an amplifier, and transmit and receive a wireless signal via the antenna 2516. The radio communication interface 2512 may be a chip module on which the BB processor 2513 and the RF circuit 2514 are integrated. As shown in FIG. 11, the radio communication interface 2512 may include multiple BB processors 2513 and multiple RF circuits 2514. Although FIG. 11 shows the example in which the radio communication interface 2512 includes multiple BB processors 2513 and multiple RF circuits 2514, the radio communication interface 2512 may include a single BB processor 2513 or a single RF circuit 2514.

In addition to the cellular communication scheme, the radio communication interface 2512 may support an additional type of wireless communication scheme, such as a short-distance wireless communication scheme, a near field communication scheme and a wireless local area network (LAN) scheme. In this case, the radio communication interface 2512 may include a BB processor 2513 and an RF circuit 2514 for each of the wireless communication schemes.

Each of the antenna switches 2515 switches a connection destination of the antenna 2516 between multiple circuits (such as circuits for different wireless communication schemes) included in the radio communication interface 2512.

Each of the antennas 2516 includes one or more antenna elements (such as multiple antenna elements included in the MIMO antenna), and is for the radio communication interface 2512 to transmit and receive a wireless signal. As shown in FIG. 11, the smart phone 2500 may include multiple antennas 2516. Although FIG. 11 shows the example in which the smart phone 2500 includes multiple antennas 2516, the smart phone 2500 may include a single antenna 2516.

In addition, the smart phone 2500 may include antennas 2516 for different wireless communication schemes. In this case, the antenna switch 2515 may be omitted in the configuration of the smart phone 2500.

The processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512 and the auxiliary controller 2519 are connected with one another via the bus 2517. The battery 2518 supplies power to the modules of the smart phone 2500 shown in FIG. 13 via a feed line. The feed line is partially shown with a dash line in the figure. The auxiliary controller 2519, for example, operates a minimum necessary function of the smart phone 2500 in a sleep mode.

In the smart phone 2500 shown in FIG. 11, the transceivers described in conjunction with FIG. 4 and FIG. 5 can be implemented by the radio communication interface 2512. The storage described in conjunction with FIG. 5 may be implemented by the memory 2502 and the storage 2503. At least a portion of the functions of the units described with reference to FIGS. 1 to 5 may be implemented by the processor 2501 or the auxiliary controller 2519. For example, an electric power consumption of the battery 2518 can be reduced in a way of performing a portion of functions of the processor 2501 by the auxiliary controller 2519. In addition, the processor 2501 or auxiliary controller 2519 can perform at least a portion of functions of the units described with reference to FIGS. 1 to 5 by executing programs stored in the memory 2502 or storage 2503.

Application Examples of a Base Station

Figure 12:
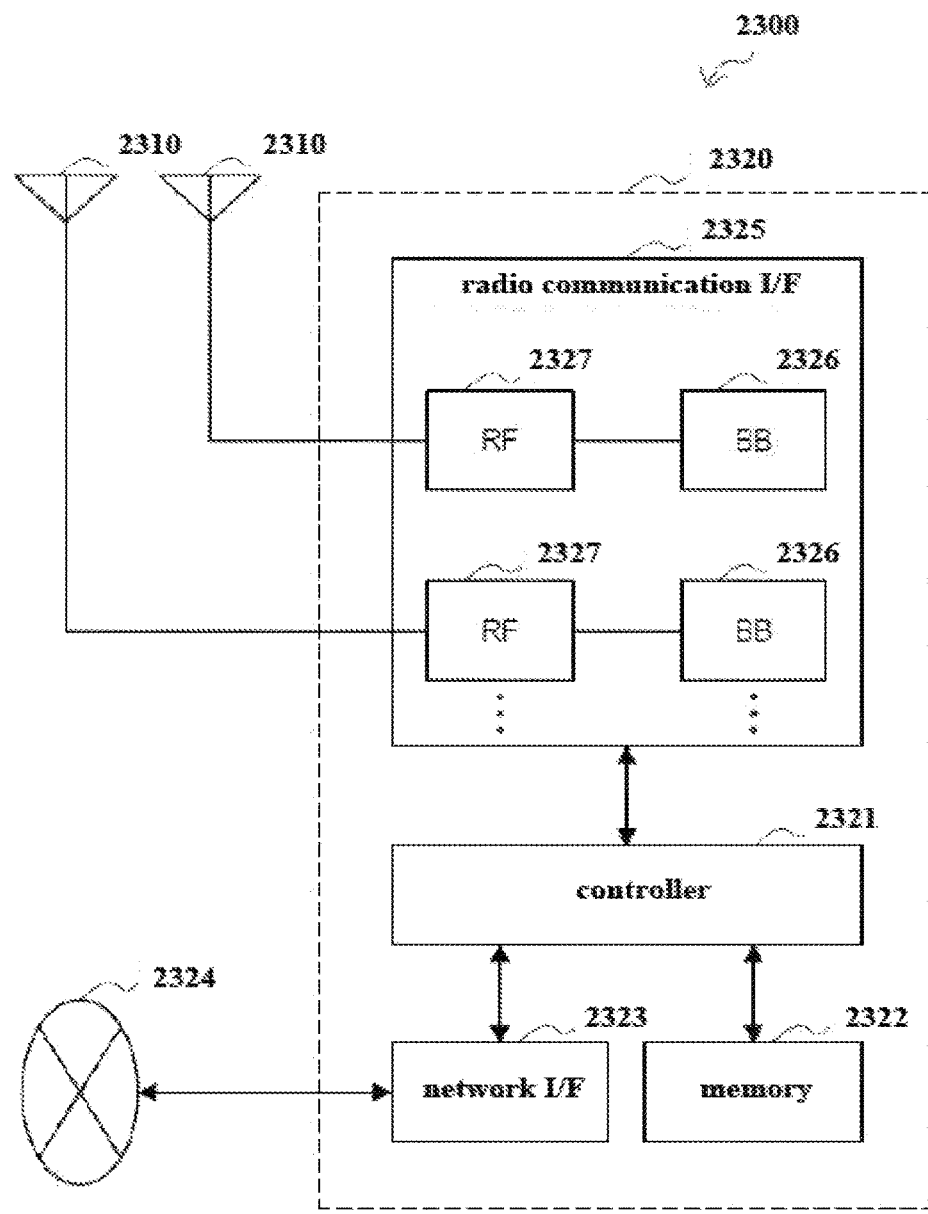
FIG. 12 is a block diagram showing an example of an illustrative configuration of an evolved base station (eNB) to which a technology according to the present disclosure can be applied.

FIG. 12 is a block diagram showing an example of a schematic configuration of an eNB to which the technology according to the present disclosure can be applied. An eNB 2300 includes one or more antennas 2310 and a base station device 2320. The base station device 2320 may be connected to each of the antennas 2310 via a radio frequency (RF) cable.

Each of the antennas 2310 includes one or more antenna elements (such as multiple antenna elements included in a multiple-input multiple-output (MIMO) antenna), and is for the base station device 2320 to transmit and receive a wireless signal. As shown in FIG. 12, the eNB 2300 may include multiple antennas 2310. For example, the multiple antennas 2310 may be compatible with multiple frequency bands used by the eNB 2300. Although FIG. 12 shows the example in which the eNB 2300 includes multiple antennas 2310, the eNB 2300 may include a single antenna 2310.

The base station device 2320 includes a controller 2321, a memory 2322, a network interface 2323 and a radio communication interface 2325.

The controller 2321 may be for example a CPU or a DSP, and operates various functions of a high layer of the base station device 2320. For example, the controller 2321 generates a data package based on data of a signal processed by the radio communication interface 2325, and transfers the generated package via the network interface 2323. The controller 2321 may bundle data from multiple baseband processors to generate a bundling package, and transfers the generated bundling package. The controller 2321 may have a logical function for performing the following controls: radio resource control, radio bearer control, mobility management, admission control and scheduling. The control may be performed in conjunction with a nearby eNB or core network node. The memory 2322 includes RAM and ROM, and stores programs to be executed by the controller 2321 and various types of control data (such as a terminal list, transmission power data and scheduling data).

The network interface 2323 is a communication interface for connecting the base station device 2320 to a core network 2324. The controller 2321 may communicate with a core network node or another eNB via the network interface 2323. In this case, the eNB 2300 may be connected with the core network node or other eNBs via a logic interface (such as an interface S1 and an interface X2). The network interface 2323 may be a wired communication interface or a radio communication interface for wireless backhaul routing. If the network interface 2323 is a radio communication interface, the network interface 2323 may use a frequency band for wireless communication higher than that used by the radio communication interface 2325.

The radio communication interface 2325 supports any cellular communication scheme (such as Long Term Evolution (LTE) and LTE-advanced), and provides a wireless connection to a terminal located in a cell of the eNB 2300 via the antenna 2310. The radio communication interface 2325 may generally include for example a BB processor 2326 and an RF circuit 2327. The BB processor 2326 may perform for example coding/decoding, modulation/demodulation and multiplexing/demultiplexing, and performs various types of signal processing of layers (such as L1, Media Access Control (MAC), Radio Link Control (RLC) and Packet Data Convergence Protocol (PDCP)). Instead of the controller 2321, the BB processor 2326 may have a portion or all of the above logical functions. The BB processor 2326 may be a memory storing communication control programs, or a module including a processor and a related circuit which are configured to execute programs. In this way, the function of the BB processor 2326 may be changed when the programs are updated. The module may be a card or blade inserted into the slot of the base station device 2320. Alternatively, the module may be a chip mounted on the card or the blade. Meanwhile, the RF circuit 2327 may include for example a frequency mixer, a filter and an amplifier, and transmit and receive a wireless signal via the antenna 2310.

As shown in FIG. 12, the radio communication interface 2325 may include multiple BB processors 2326. For example, the multiple BB processors 2326 may be compatible with the multiple frequency bands used by the eNB 2300. As shown in FIG. 12, the radio communication interface 2325 may include multiple RF circuits 2327. For example, the multiple RF circuits 2327 may be compatible with multiple antenna elements. Although FIG. 12 shows an example in which the radio communication interface 2325 includes multiple BB processors 2326 and multiple RF circuits 2327, the radio communication interface 2325 may include a single BB processor 2326 or a single RF circuit 2327.

In the eNB 2300 shown in FIG. 12, the transceiver may be realized by the radio communication interface 2325, and at least a portion of functions of the units described in conjunction with FIG. 7 and FIG. 8 may be realized by the controller 2321. For example, the controller 2321 may perform at least a portion of functions of the units described in conjunction with FIG. 7 and FIG. 8 by performing programs stored in the memory 2322.

Application Example of an Automobile Navigation Device

Figure 13:
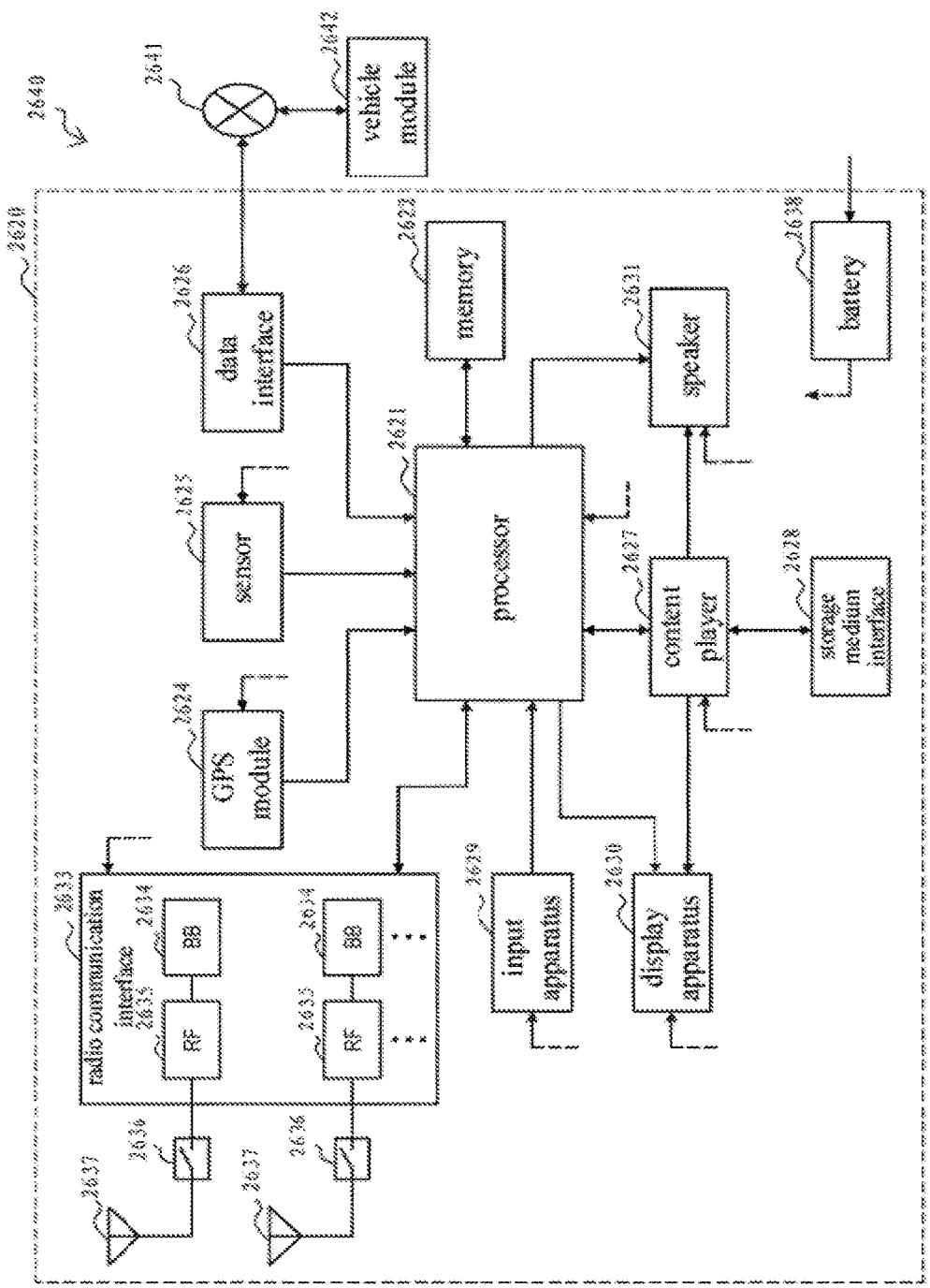
FIG. 13 is a block diagram showing an example of an illustrative configuration of an automobile navigation device to which a technology according to the present disclosure can be applied.

FIG. 13 is a block diagram showing an example of a schematic configuration of an automobile navigation device 1320 to which the technology according to the present disclosure may be applied. The automobile navigation device 1320 includes a processor 1321, a memory 1322, a global positioning system (GPS) module 1324, a sensor 1325, a data interface 1326, a content player 1327, a storage medium interface 1328, an input apparatus 1329, a display apparatus 1330, a speaker 1331, a radio communication interface 1333, one or more antenna switches 1336, one or more antennas 1337 and a battery 1338.

The processor 1321 may be for example a CPU or an SoC, and controls a navigation function and additional function of the automobile navigation device 1320. The memory 1322 includes RAM and ROM, and stores programs executed by the processor 1321 and data.

The GPS module 1324 determines the location of the automobile navigation device 1320 (such as latitude, longitude and height) with a GPS signal received from a GPS satellite. The sensor 1325 may include a group of sensors such as a gyroscope sensor, a geomagnetic sensor and an air pressure sensor. The data interface 1326 is connected to for example an on-board network 1341 via a terminal not shown, and acquires data generated by the automobile (such as vehicle speed data).

The content player 1327 reproduces contents stored in a storage medium (such as CD and DVD) which is inserted into the storage medium interface 1328. The input apparatus 1329 includes for example a touch sensor configured to detect touch on a screen of the display apparatus 1330, a button or a switch, and receives an operation or information inputted by the user. The display apparatus 1330 includes a screen of a display such as an LCD or OLED, and displays an image of navigation function or the reproduced contents. The speaker 1331 outputs voice of the navigation function or the reproduced contents.

The radio communication interface 1333 supports any cellular communication scheme (such as LTE and LTE-advanced), and performs wireless communication. The radio communication interface 1333 may generally include for example a BB processor 1334 and an RF circuit 1335. The BB processor 1334 may perform for example coding/decoding, modulation/demodulation and multiplexing/demultiplexing, and perform various types of signal processing for wireless communication. Meanwhile, the RF circuit 1335 may include for example a frequency mixer, a filter and an amplifier, and transmit and receive a wireless signal via the antenna 1337. The radio communication interface 1333 may be a chip module on which the BB processor 1334 and the RF circuit 1335 are integrated. As shown in FIG. 13, the radio communication interface 1333 may include multiple BB processors 1334 and multiple RF circuits 1335. Although FIG. 13 shows the example in which the radio communication interface 1333 includes multiple BB processors 1334 and multiple RF circuits 1335, the radio communication interface 1333 may include a single BB processor 1334 or a single RF circuit 1335.

In addition to the cellular communication scheme, the radio communication interface 1333 may support an additional type of wireless communication scheme, such as a short-distance wireless communication scheme, a near field communication scheme and a wireless LAN scheme. In this case, the radio communication interface 1333 may include a BB processor 1334 and an RF circuit 1335 for each of the wireless communication schemes.

Each of the antenna switches 1336 switches a connection destination of the antenna 1337 between multiple circuits (such as circuits for different wireless communication schemes) included in the radio communication interface 1333.

Each of the antennas 1337 includes one or more antenna elements (such as multiple antenna elements included in the MIMO antenna), and is for the radio communication interface 1333 to transmit and receive a wireless signal. As shown in FIG. 13, the automobile navigation device 1320 may include multiple antennas 1337. Although FIG. 13 shows the example in which the automobile navigation device 1320 includes multiple antennas 1337, the automobile navigation device 1320 may include a single antenna 1337.

In addition, the automobile navigation device 1320 may include antennas 1337 for different wireless communication schemes. In this case, the antenna switch 1336 may be omitted in the configuration of the automobile navigation device 1320.

The battery 1338 supplies power to the modules of the automobile navigation device 1320 shown in FIG. 13 via a feed line. The feed line is partially shown with a dash line in the drawing. The battery 1338 accumulates the power provided from the vehicle.

In the automobile navigation device 1320 shown in FIG. 13, the transceivers described in conjunction with FIG. 4 and FIG. 5 may be implemented by the radio communication interface 1333. The storage described in conjunction with FIG. 5 may be implemented by the memory 1322. The processor 1321 may perform at least a portion of functions of the units described in conjunction with FIG. 1 to FIG. 5 by executing programs stored in the memory 1322.

The technology according to the present disclosure may be further implemented as an on-board system (or a vehicle) 1340 including one or more of the automobile navigation device 1320, the on-board network 1341 and a vehicle module 1342. The vehicle module 1342 generates vehicle data (such as a vehicle speed, a motor speed and fault information) and outputs the generated data to the on-board network 1341.

In the above description of the embodiments of the present disclosure, features that are described and/or illustrated with respect to one embodiment may be used in the same way or in a similar way in one or more other embodiments, may be combined with or instead of the features of the other embodiments.

It should be emphasized that the term "comprises/comprising" used in this specification refers to the presence of features, elements, steps or components, but does not preclude the presence or addition of one or more other features, elements, steps or components.

In the above embodiments and examples, the steps and/or units are represented with reference numbers consists of numbers. It should be understood by those skilled in the art that, these reference numbers are only for convenience of the description and drawing, and are not intended to represent an order of the steps and units or to represent any other constraint.

In addition, the methods according to the present disclosure are not limited to be executed in the time sequence described in the specification, and may be executed in other time sequence, parallel or independently. Therefore, the execution order of the method described in the specification is not intended to limit the technical scope of the present disclosure.

While the present disclosure has been disclosed with reference to the specific embodiments thereof, it should be understood that all of the above embodiments and examples are illustrative rather than restrictive. Those skilled in the art will appreciate that various modifications, improvements and equivalents are possible, without departing from the spirit and scope of the appended claims. These modifications, improvements or equivalents are intended to be included within the protection scope of the present disclosure.

The invention claimed is:

1. A wireless communication device, comprising:
circuitry configured to:
determine a priority of information to be transmitted via a device-to-device (D2D) communication, the priority being one of a plurality of priorities that includes at least a first priority and a second priority;
determine a transmission power for the information based on a maximum transmission power for D2D communication, the maximum transmission power being based on the determined priority of the information, and
transmit the information to another wireless communication device with the determined transmission power, wherein
the transmission power is related to an expected detection rate of the D2D communication.

2. The wireless communication device according to claim 1, wherein the circuitry is configured to determine the transmission power as a minimum power among a plurality of powers including the maximum transmission power.

3. The wireless communication device according to claim 1, wherein the transmission power is determined based on a requirement on latency of the information to be transmitted in the D2D communication.

4. The wireless communication device according to claim 1, wherein
the first priority is higher than the second priority, and
information with the first priority has a stricter requirement on latency than information with the second priority.

5. The wireless communication device according to claim 1, wherein the transmission power is related to an expected coverage range of the D2D communication.

6. The wireless communication device according to claim 1, wherein the circuitry is further configured to determine communication resources for transmitting the information based on the priority thereof.

7. The wireless communication device according to claim 1, wherein the information of the first priority comprises safety information.

8. The wireless communication device according to claim 1, wherein the circuitry is further configured to select a communication resource for transmitting the information of the second priority from shared communication resources which are used for the D2D communication and communication between a base station and a user equipment.

9. The wireless communication device according to claim 1, wherein
the circuitry is further configured to select a communication resource for transmitting the information from reserved communication resources, and
the D2D communication has a priority in utilizing the reserved communication resources over communication between a base station and a user equipment.

10. The wireless communication device according to claim 9, wherein the reserved communication resources comprise a communication resource of an unlicensed frequency band.

11. The wireless communication device according to claim 1, wherein the wireless communication device operates as a user equipment.

12. The wireless communication device according to claim 11, wherein the user equipment is a vehicle.

13. A base station device, comprising:
circuitry configured to:
- determine transmission control parameters for a device-to-device (D2D) communication based on a priority of information to be transmitted in the D2D communication, the priority being one of a plurality of priorities that includes at least a first priority and a second priority;
- provide the transmission control parameters to a user equipment involved in the D2D communication, the transmission control parameters comprising at least one of transmission power control parameters and resource configuration parameters; and
- generate a radio resource control signaling including the transmission control parameters for transmitting to the user equipment, wherein the circuitry includes different groups of transmission control parameters for different priorities of information to be transmitted in D2D communication in the radio resource control signaling.

14. A wireless communication method, comprising:
- determining, by circuitry of a wireless communication device, a priority of information to be transmitted via a device-to-device (D2D) communication, the priority being one of a plurality of priorities that includes at least a first priority and a second priority;
- determining, by the circuitry, a transmission power for the information based on a maximum transmission power for D2D communication, the maximum transmission power being based on the determined priority of the information, and
- transmitting the information to another wireless communication device with the determined transmission power, wherein the transmission power is related to an expected detection rate of the D2D communication.

15. The wireless communication method according to claim 14, wherein the transmission power is determined as a minimum power among a plurality of powers including the maximum transmission power.

16. The wireless communication method according to claim 14, wherein the transmission power is determined based on a requirement on latency of the information to be transmitted in the D2D communication.

17. The wireless communication method according to claim 14, wherein
the first priority is higher than the second priority, and
information with the first priority has a stricter requirement on latency than information with the second priority.

18. The wireless communication method according to claim 14, wherein the transmission power is related to an expected coverage range of the D2D communication.

19. The wireless communication method according to claim 14, further comprising determining communication resources for transmitting the information based on the priority thereof.

20. The wireless communication method according to claim 14, wherein the information of the first priority comprises safety information.

* * * * *